Aug. 14, 1951     C. E. BISHOP     2,564,592
CONTROL DEVICE FOR COUPLED ARTICULATED VEHICLES
Filed Aug. 21, 1948     2 Sheets—Sheet 1
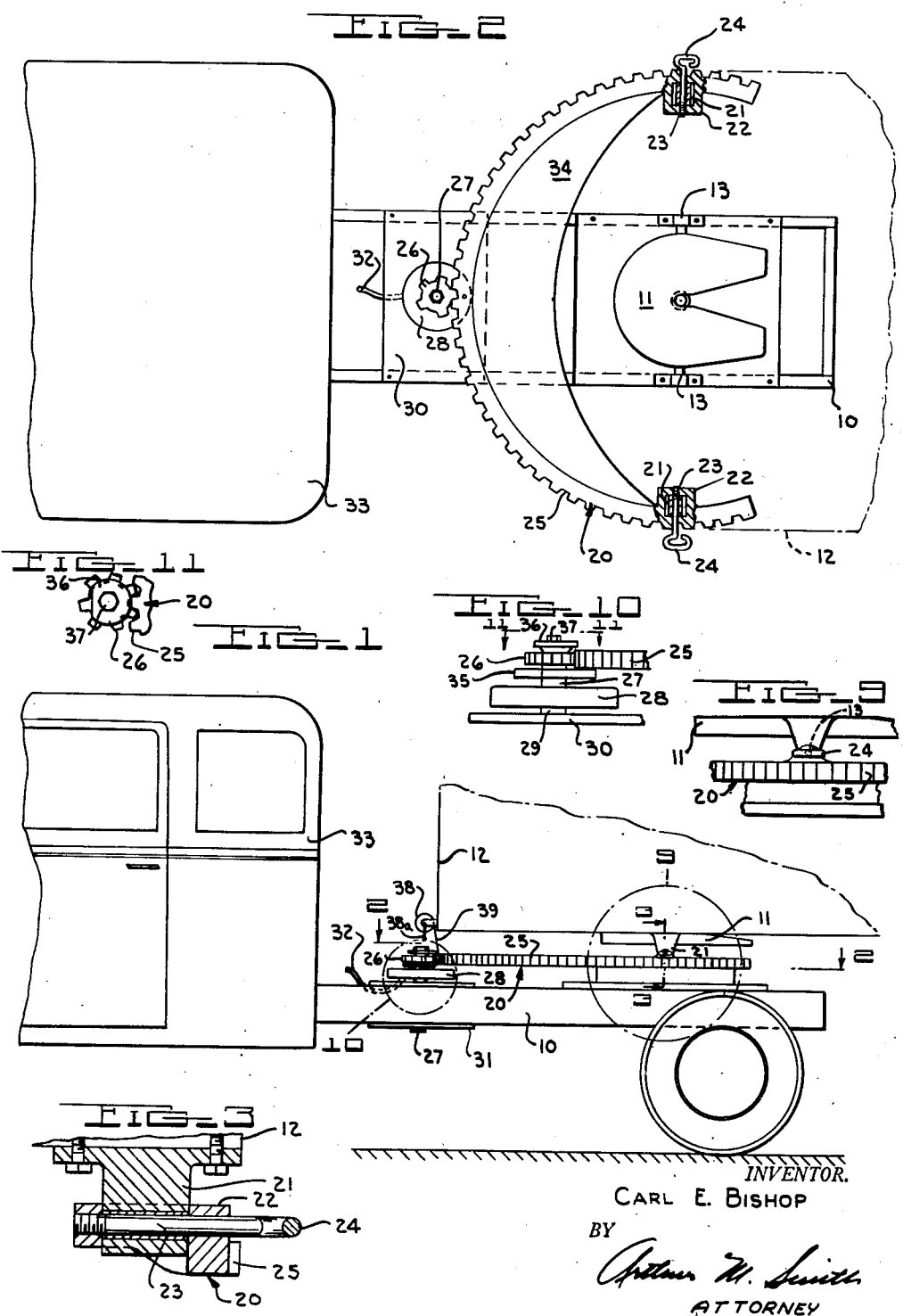
INVENTOR.
CARL E. BISHOP
BY
*Arthur M. Smith*
ATTORNEY Aug. 14, 1951     C. E. BISHOP     2,564,592
CONTROL DEVICE FOR COUPLED ARTICULATED VEHICLES
Filed Aug. 21, 1948     2 Sheets-Sheet 2
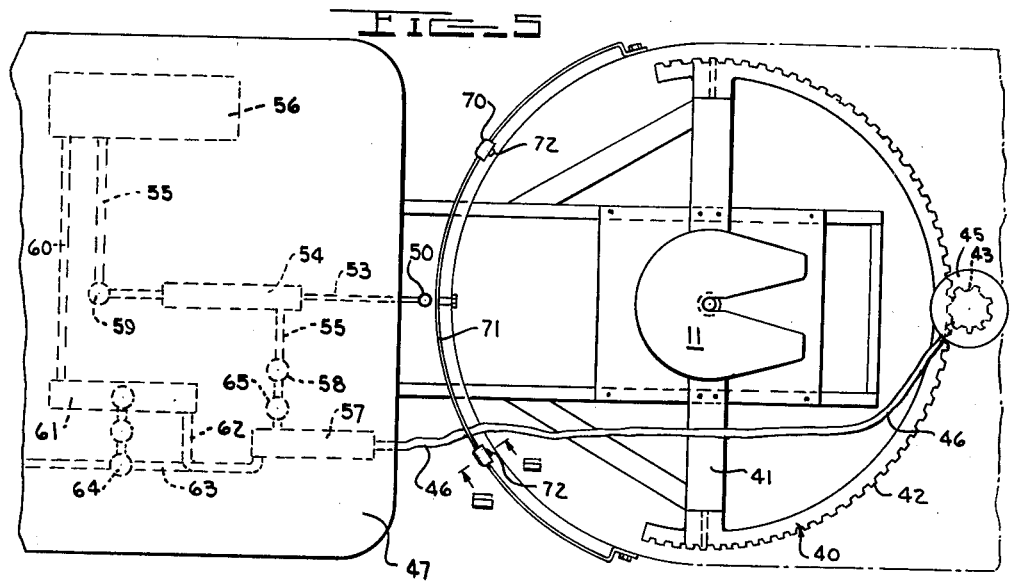
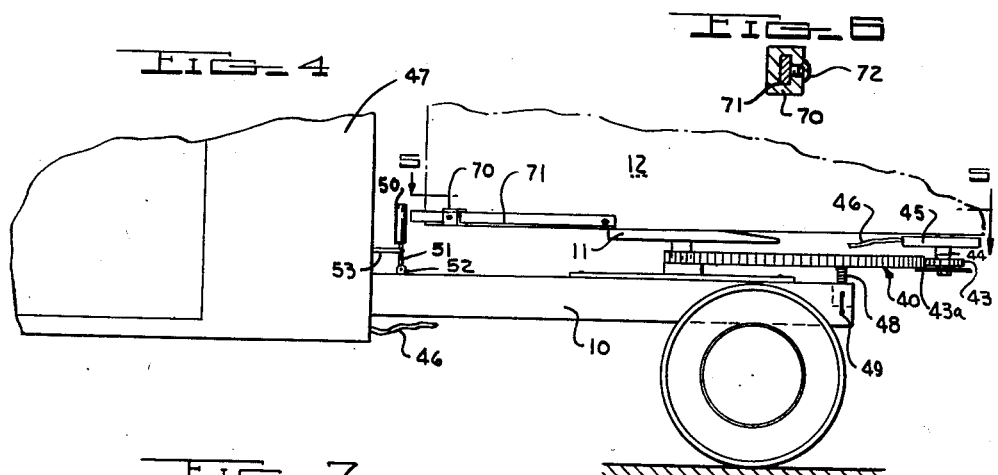
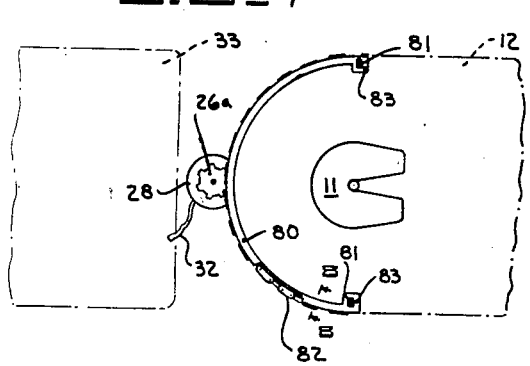
INVENTOR.
CARL E. BISHOP
BY
ATTORNEY Patented Aug. 14, 1951

2,564,592

UNITED STATES PATENT OFFICE 2,564,592

CONTROL DEVICE FOR COUPLED ARTICULATED VEHICLES

Carl E. Bishop, Carlisle, Iowa

Application August 21, 1948, Serial No. 45,456

8 Claims. (Cl. 280—33.05)

The present invention relates to a control device for coupled articulated vehicles and more particularly to such a device for controlling the pivotal movement between the coupled component units of such vehicles. The control device of the present invention is particularly, but not exclusively adapted for use in controlling relative movement between a coupled tractor and a semi-trailer about the vertical axis of the coupling.

One conventional type of semi-trailer is coupled with a tractor by means of a fifth wheel coupling unit which provides an articulated joint around which the coupled units may pivot. Such a joint makes it difficult to control the parking of the semi-trailer unit and makes it impossible to control the pivotal movement of the units relative to each other about the vertical axis of the coupling during operation as a coupled unit. This latter defect has been the cause of many accidents due to the so-called "jack-knifing" of the units. "Jack-knifing" occurs when pivotal movement of the connected units relative to each other around the vertical axis of the articulated joint progresses to the point that the longitudinal axes of the coupled vehicles are displaced from their normally aligned positions and are angularly disposed to each other at an acute angle usually less than a right angle. When such a condition occurs during motion of the vehicle the driver loses control of the unit. "Jack-knifing" also may occur in starting a coupled unit if the traction on the road surface is poor. Under these conditions the tractor drive wheels may spin, causing it to move into such an angular position relative to the trailer that it is impossible to align the units without the aid of a tow truck.

In its broadest aspect, the present invention provides a braking force which is applied adjacent the articulated coupling for the purpose of controlling the relative pivotal movements of articulated vehicle units about the vertical axis of the coupling, the invention thus providing a control device which will prevent extreme pivotal movements of the units relative to each other, either in starting or during road operation and which also may be employed to facilitate parking of the trailer unit.

Control devices heretofore suggested for such uses have not provided the desired degree of control of the relative pivotal movements of the connected units about the vertical axis of the coupling while providing the flexibility required to permit free pivoting of the units about the transverse axis of the coupling. Also the prior suggested control devices have not been readily adapted for installation on existing equipment as well as on original equipment and have made coupling and uncoupling of the units difficult for the driver.

It is therefore, an important object of the present invention to provide a control device for the coupled units of an articulated vehicle which permits a free pivotal movement of the coupled units about the transverse axis of the coupling and which provides a selective control of the relative pivotal movement of the coupled units about the vertical axis of the coupling, either during starting, road operation or parking.

It is a further object of the present invention to provide a control device for the coupled units of an articulated vehicle in which the units of the control device are adapted for ready installation either on new vehicle units or on existing vehicle units and which will provide the operator at all times with a ready control for the relative pivotal movement of the coupled vehicle units about the vertical axis of the coupling.

It is a further object of the present invention to provide a control device for the coupled units of an articulated vehicle in which provision may be made for automatic operation of the control by pivotal movement of the connected units beyond adjustable predetermined limits.

It is a further object of the present invention to provide a control device for the coupled units of an articulated vehicle which device may be readily manufactured, installed and maintained at relatively low cost and which is of sturdy construction and of a rugged, simplified design which eliminates losses due to breakage or the like.

It is a further object of the present invention to provide a control device which is under the control of the operator at all times to control relative pivotal movement of the coupled units of an articulated vehicle about the vertical axis of the coupling and which does not interfere with the normal operation of the coupled vehicle units or with the normal coupling and uncoupling thereof.

Other objects of this invention will appear in the following description and appended claims, reference being had to the accompanying drawings forming a part of this specification wherein like reference characters designate corresponding parts in the several views.

In the drawings:

Fig. 1 is a side elevation of the coupled units of an articulated vehicle, the view being taken at the fifth wheel coupling and showing a portion of the tractor and a portion of the coupled semi-trailer utilizing one form of control device embodying the present invention.

Fig. 2 is a top plan view partially in section of the device shown in Fig. 1 taken substantially on the line 2—2 in the direction of the arrows Fig. 1.

Fig. 3 is a section taken substantially on the line 3—3 in the direction of the arrows Fig. 2.

Fig. 4 is a view similar to Fig. 1, but showing a modified form of control device embodying the present invention.

Fig. 5 is a top plan view of Fig. 4 partially in section taken substantially on the line 5—5 in the direction of the arrows Fig. 4.

Fig. 6 is a section taken substantially on the line 6—6 in the direction of the arrows Fig. 5.

Fig. 7 is a top plan partially in section, showing a modified form of control device embodying the present invention applied to a coupled tractor and semi-trailer shown in phantom outline.

Fig. 8 is a section taken substantially on line 8—8 in the direction of the arrows Fig. 7.

Fig. 9 is an enlarged side elevation of the circled portion numbered 9 in Fig. 1.

Fig. 10 is an enlarged side elevation of the circled portion numbered 10 in Fig. 1.

Fig. 11 is a top plan taken substantially on the line 11—11 in the direction of the arrows, Fig. 10.

Before explaining the present invention in detail it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Throughout the several views the numeral 10 indicates a conventional tractor vehicle having a conventional tractor fifth wheel coupling unit 11 here shown as of the conventional rocking fifth wheel type. The numeral 12 indicates a conventional semi-trailer having a conventional trailer king-pin (not shown) adapted for coupled engagement in the tractor portion of the fifth wheel coupling unit 11.

When coupled, as shown in the several views, the tractor 10 and semi-trailer 12 form an articulated vehicle unit having a vertical pivot axis extending through the tractor fifth wheel coupling 11 and the king-pin carried by the trailer and having a horizontal pivot axis extending through the pivotal mounting 13 of the tractor fifth wheel coupling 11.

The tractor 10, semi-trailer 12, and the coupling unit above described are all conventional units and as such are not a part of the present invention so are not here shown or described in detail, it being understood by those skilled in the art that conventional types of units are intended to be used with the control device of the present invention.

The articulation of the tractor 10 and the semi-trailer 12 about both a vertical and a horizontal pivot axis permits a coupling of the connected units for limited universal movement at the coupling point. It is desirable to provide a free movement about the horizontal pivot axis. However, control is desired of the relative movement of the tractor 10 and semi-trailer 12 about the vertical pivot axis. Uncontrolled pivotal movement of the coupled units about the vertical axis makes it very difficult to control the relative pivotal movement of the tractor 10 and trailer 12 during starting of the coupled units, during road operation of the connected vehicles and during parking of the trailer. The control of such relative movement of the units about the vertical axis of the coupling is the function of the device embodying the present invention which will now be described in detail.

A device embodying the present invention as shown in Figs. 1, 2 and 3 comprises a sector gear 20 which is hinged adjacent its ends about a hinge axis which is co-incident with the transverse axis of the coupling at the forward end of the semi-trailer 12 and extends downwardly therefrom by reason of the depending brackets 21 which are secured to opposite sides of the semi-trailer 12 adjacent its forward end. Hinge eyes 22 are provided adjacent the ends of the sector gear 20 and a pintle 23 extends through the said hinge eyes 22 and through a pintle opening provided in the depending brackets 21. A quick release handle 24 is secured to an end of each of the pintles 23 and is located at a point adjacent the outside edges of the frame of the semi-trailer 12 to enable the operator to readily remove the pintles 23 and thus detach the sector gear 20 from the semi-trailer 12 when desired.

The sector gear 20 is formed on an arc whose center lies on the vertical axis of the trailer king-pin. The radius of the arc is of such a length that the gear teeth 25 lie on a circumference which is concentric with and slightly larger than the circumference of the arc of the forward end of the semi-trailer 12. As shown, the ends of the sector gear extend rearwardly beyond the hinge eyes 22 and gear teeth are provided therein to assure constant meshing of the connected gears for the full extent of the pivotal movement of the units about the vertical axis of the coupling.

The sector gear 20 may be formed of any desired materials possessing the sufficient strength properties. I prefer to form the sector gear 20 from thick sheet steel or the like by a conventional flame cutting operation, which in addition to forming the gear, also has a hardening effect on the teeth thereof. Other suitable construction may be machined steel or gray iron castings of suitable sizes. It is preferable that the sector gear 20 may be reenforced in any suitable manner such for example as the web 34.

In order to hold the gear 20 in a desired horizontal position relative to the trailer 12, a hand winch 38 having a handle 38a is provided on the trailer 12 and has a cable 39 which is connected with the gear 20 so that rotation of the winch 38 will raise and lower the gear 20 about its hinged connection with the trailer.

A spur gear 26 having teeth meshing with the teeth 25 of the sector gear 20 is secured to a hollow spindle 27 which is mounted on a brake drum 28. The spindle 27 and drum 28 are journaled for rotation on a stationary shaft 29 secured to the mounting plates 30 and 31 mounted on the frame of the tractor 10.

As shown in detail in Fig. 10, the sector gear 20 is held in position to mesh with the gear 26 by a supporting plate 35 which is mounted on the hollow spindle 27 and has an outwardly extended annular flange for supporting the lower face of the gear 20. A top member 36 having one flat face and having an outwardly extended annular collar portion is secured to the hollow spindle 27 by a nut 37. This construction permits rotation of the member 36 to a position in which the flat face of the member 36 allows the teeth 25 of the gear 20 to clear the member 36 and contact the plate 35. When the gear 20 is in position on the plate 35 and is meshed with the gear 26, the member 36 is rotated so that the outwardly flanged portion occupies the position shown in Fig. 2 and the nut 37 is tightened. This holds the gear 26 in the position shown in Fig. 10.

Any conventional type of friction brake mechanism may be used to control rotation of the brake drum 28. Such a brake may include a backing plate, a friction member and a brake actuator, all of which may be mounted on the mounting plate 30 inside the brake drum 28. I prefer to use the hydraulically actuated brake shoe type of brake, but may also use the disc type of brake and may actuate the brakes by electrical or mechanical as well as by hydraulic means. Since such brakes are conventional and well known in the art they have been omitted from the present drawings in the interest of greater clarity.

In the preferred embodiment of the invention, I utilize hydraulic actuation of the brake and provide a fluid pressure line 32 which extends from the brake mechanism to a conventional fluid pressure master cylinder 57 (Fig. 5) which is actuated by the operator from the cab 33 of the tractor 10 by any conventional type of control.

The device shown in Figures 1, 2 and 3 will control relative pivotal movement between the tractor 10 and the semi-trailer 12 about the vertical pivot axis in the following manner. Assuming that no braking pressure is applied to the brake drum 28, the gear 26 and the spindle 27 are driven by the teeth 25 of the sector gear 20 and rotate freely. Thus any pivotal movement of the tractor 10 and semi-trailer 12 about the vertical pivot axis is permitted so long as the spur gear 26 is free to rotate. Upon the application of a braking force on the braking drum 28, the rotation of the spur gear 26 is retarded or stopped as desired by the operator. This application of braking force is transmitted through the sector gear 20 to the semi-trailer 12 and further relative pivotal movement of the trailer 12 and the tractor 10 about the vertical pivot axis is retarded or stopped as desired by the operator.

It will be apparent that this control of the relative pivotal movement of the tractor 10 and the semi-trailer 12 about their vertical pivot axes is accomplished without interference with the normal pivotal movement of the units about their horizontal pivot axis. This permits the normal relative movements of the units as required by road surface irregularities or the like. The hinged connection of the sector gear 20 to the semi-trailer 12 permits it to be maintained in meshed relation at all times with the spur gear 26. Thus control of the pivotal movement about the vertical axis of the coupling is possible at all times.

It will be apparent to those skilled in the art that such a device is very advantageous for controlling such relative movement of the coupled units due to spinning of the tractor wheels as in starting, side sway and pivotal movement of the trailer due to road irregularities or skidding of the trailer, either because of faulty brake application, sudden stops, icy road conditions or the like. At any time that the tractor and trailer move angularly relative to each other, the operator may apply a braking pressure through the spur gear 26 and if he desires so to do, to lock the tractor and trailer in such angular position. When in this position it will be apparent that an additional braking effect is exerted on the articulated vehicle since the sidewise or angular movement of the trailer relative to the road exerts a further drag and braking effect on the unit.

The parking of a semi-trailer requires great skill on the part of the operator and frequently cannot be accomplished without considerable loss of time and sometimes without damage to the equipment. The control device of the present invention may be applied to hold the tractor and trailer against relative pivotal movement after the trailer has been lined up with the parking space. When backing the tractor through a coupling which thus does not permit relative pivotal movement of the connected units about a vertical axis it is possible to park the trailer in much less time and with much greater accuracy than is possible with conventional units in which such a device is not incorporated.

A modified embodiment of the present invention is shown in Figs. 4 to 6 inclusive. As shown in these figures, a sector gear 40 formed in the same manner as the sector gear 20 previously described, is pivotally attached to the ends of a mounting plate 41 which is secured to the frame of the tractor 10 directly below the tractor fifth wheel coupling 11. The points of pivotal attachment of the ends of the sector gear 40 are aligned axially with the horizontal pivot axis of the coupling 11. The gear teeth 42 of the sector gear 40 open toward the rear of the tractor 10 and mesh with the teeth on the rotatable spur gear 43 secured to a hollow spindle 44 which is secured to the rotatable brake drum 45 and is mounted for rotation about a fixed shaft on the semi-trailer 12.

Where the form of gear shown in Figs. 4 and 5 is used, the gear 40 is raised and lowered relative to the frame of the tractor 10 by a hand operated jack member 48 mounted on the tractor and having an operating handle 49. As the handle 49 is rotated, the jack member 48 is extended or retracted to raise or lower the gear 40 for alignment with the gear 43.

In this construction it is preferable to provide an annular gear supporting plate member 43a which is attached to the hollow spindle 44.

A conventional type of friction brake actuating mechanism including a backing plate, a friction braking member, a brake actuator and the like is mounted on the semi-trailer 12. Since these parts are all well known and are conventional in this art, they have been omitted from the drawings herein in the interest of greater clarity.

In the embodiment of the invention here shown, I prefer to use a hydraulic brake system having a fluid pressure line 46 which connects the brake operating mechanism with the brake controls which are located in the cab 47 of the tractor 10.

In Figs. 4, 5 and 6 I have shown a device embodying the present invention which may be used if desired for automatic application of a braking force to the drum 45 by the relative pivotal movement of the tractor 10 and the trailer 12 about the vertical pivot axis of the coupling. As here shown, a brake actuating roller 50 is mounted on a vertically extending shaft 51 which is hinged at its lower end at the point 52 to the frame of the tractor 10. A valve operating push rod 53 is pivotally connected to the shaft 51 between the hinged connection 52 and the brake actuating roller 50. The valve operating push rod 53 extends forwardly therefrom to a point of connection with the actuator of an automatic brake applying valve 54. The automatic brake applying valve 54 is placed in a line 55 leading from the pressure tank 56 to the brake master cylinder 57. A check valve 58 is provided in the line 55 between the automatic valve 54 and the master cylinder 57 and a shut off valve 59 is placed in the line 55 between the automatic valve 54 and the pressure tank 56. Actuation of the shut off valve 59 is controlled by the operator from the cab so that the automatic brake application may be cut off at will. A line 60 leads from the pressure tank 56 to a manually operated control cylinder 61 which in turn is connected by a line 62 with the brake master cylinder 57.

Thus it will be seen that by actuation of the control cylinder 61, the brakes may be controlled manually by the operator at all times. The check valve 58 in this instance prevents a by-passing of the pressure fluid through the line 55. An exhaust line 63 leads from the master cylinder 57 through an exhaust valve 64.

A pressure cut off valve 65 is connected in the line 55 between the master cylinder 57 and the check valve 58 and is suitably connected with the exhaust valve 64 so that the operator may, by actuation of the exhaust valve 64, temporarily cut off the automatic actuation of the device at the same time that he releases the braking pressures applied thereto.

This system, except for the automatic valve 54 and its actuation by the brake control roller 50, is a conventional fluid pressure braking system, using both compressed air and a hydraulic brake system. It is to be understood however, that by suitable changes in the valve lines etc. as is well known by those skilled in the art, any desired type of brake may be used in place of the air and hydraulic brakes as here shown.

The brake actuating roller 50 is moved forwardly about the hinge point 52 by contact with one of a plurality of adjustable brake actuating cams 70 which are slidably mounted on an arcuate flat bar 71 secured to the forward end of the semi-trailer 12 and maintained in spaced relation thereto. The bar 71 is suitably secured at its end and at a midpoint to the trailer frame so as to provide a rigid track or guide about which the cams 70 may be moved. Each of the cams is held in its moved adjusted position thereon by means of a set screw 72.

By this construction it will be seen that the adjustment of the cams 70 on the flat bar 71 will determine the point at which contact is made with the brake applying roller 50. Thus, by moving the cams on the flat bar, it is possible to fix the limits of permitted pivotal movement between the coupled units of the vehicle before a braking pressure is applied on the drum 45.

When one of the cams 70 contacts the brake applying roller 50 the roller is pushed forwardly which imparts a pushing force on the valve operating push rod 53 which operates the automatic valve 54 to supply pressure fluid to the brake master cylinder 57 and in turn to apply a braking force on the brake drum 45 and thus to control rotation of the rotatable spur gear 43. The amount of braking pressure applied determines the amount of pivotal movement permitted.

While I have shown the automatic application of the brake applied to the particular type of gear arrangement shown in Figs. 4 and 5 it is to be understood that this automatic application of the braking force on the brake drum for controlling the rotation of the spur gear may be employed with any of the embodiments of the invention here shown. I do not desire, therefore, to be limited to the use of this type of brake actuating member with the particular arrangement of the sector gear and the spur gear as shown in Figs. 4 and 5.

In the modification of the present invention shown in Figs. 7 and 8, the general construction and operation as explained in connection with the construction shown in Figs. 1 to 3 is employed except that the sector gear 20 is replaced by a curved channel member 80 which is hinged at its ends as at 81 to the side frame of the trailer 12. A chain 82 is placed in the channel member 80 and secured at each end to said channel by a chain securing pin 83. As here shown, the chain 82 is engaged by the teeth of a rotatable sprocket gear 26a in the same manner as the teeth 25 of the sector gear 20 are engaged in the teeth of the spur gear 26 in the embodiment shown in Figs. 1 and 2. It is to be understood however, that if desired, the chain 82 may be placed around the sprocket gear 26a before being secured to the curved channel member 80 so that the sprocket gear 26a in this instance will occupy a position between the chain 82 and the curved channel member 80.

While a preferred operation of the brake mechanism utilizes fluid pressure actuation of the brake unit, it is to be understood that mechanically actuated brakes of any conventional type may be used by installing the conventional brake actuating linkages, flexible cables or the like.

It will be seen that a fleet of tractor and trailer vehicles equipped respectively with the tractor and trailer carried portions of the device of the present invention permits the tractor and trailer units to be coupled interchangeably with each other and still provide the desired control of the pivotal movement of the units about the vertical axis of the coupling.

It also will be seen that in all instances the hinge axis of the sector gear is co-incident with the transverse axis of the coupling and that the gear is formed as an arc whose center lies on the vertical axis of the coupling. Thus, the sector gear forming part of the control device of the present invention will permit all relative movements permitted by the coupling while allowing a selective control of the pivotal movement about the vertical axis of the coupling.

From the foregoing it will be seen that I have disclosed a control device for coupled articulated vehicles in which pivotal movement between the coupled components of such a vehicle is controlled either automatically or by the operator through the control device of the present invention. Such a device will prevent extreme pivotal movements of the units about the vertical axis of the coupler and may be used not only to avoid accidents due to jack-knifing of the units, but also to facilitate starting, parking and handling of the trailer unit. The device of the present invention permits free pivotal movement of the coupled units about the transverse axis of the coupling and provides a selective control of the relative pivotal movement of the coupled units about the vertical axis of the coupling. The device may also be readily installed either on new vehicle units or on existing units and when so installed will provide ready control of the relative pivotal movement of the coupled vehicle units about the vertical axis of the coupling. The device may be controlled either automatically as herein disclosed or manually by the operator as desired. The device may be readily manufactured and installed and maintained at a relatively low cost. It is of sturdy construction and of rugged and simplified design which eliminates losses due to breakage and the like. The unit does not interfere with the normal operation of the coupled vehicle units or with the normal coupling and uncoupling thereof and is at all times under the control of the operator.

Having thus described my invention what I desire to secure by United States Letters Patent is:

I claim:

1. A vehicle control unit adapted to control the relative pivotal movement between a connected semi-trailer and a tractor and comprising a rotatable gear member mounted on either said semi-trailer or tractor, means meshed with the teeth of said gear member and pivotally mounted on the other of said semi-trailer or tractor for swinging in a vertical plane about a substantially horizontal axis for rotating said gear member in response to relative pivotal movement between the semi-trailer and the tractor, a brake connected with said gear, and brake control means adapted to apply and release said brake to control the rotation of said rotatable gear.

2. A vehicle control unit as claimed in claim 1 and further characterized in that said means for rotating said gear comprises a hinged gear sector having teeth meshed with said rotatable gear.

3. A vehicle control unit as claimed in claim 1 and further characterized in that said rotating gear is a sprocket gear and said means for rotating said gear comprises a chain having links engaged by the teeth of said rotating sprocket gear.

4. A vehicle control unit as claimed in claim 3 and further characterized in that said chain is mounted in a hinged track.

5. A control unit as claimed in claim 1 and further characterized in that said rotatable gear member on one of the connected vehicles is mounted on a rotatable spindle with which the said brake means is associated.

6. A control unit as claimed in claim 5 and further characterized in that the mounting of the hinged sector gear includes a hinge connection having a manually retractable pintle to permit ready disengagement of said sector gear from the vehicle on which it is mounted.

7. A safety device to control pivotal movement between component units of an articulated vehicle and including a rotatable pinion gear mounted on the tractor unit, a sector gear hinged adjacent its ends to the forward end of the trailer to provide a pivotal mounting for said sector gear with its teeth in mesh with the teeth of said rotatable pinion gear, a brake connected with said rotatable pinion gear, and brake control means connected with said brake for selectively applying and releasing a braking force on said pinion gear.

8. A safety device as claimed in claim 7 and further characterized in that the said sector gear lies on an arc generated by a radius extending from the central vertical axis of the coupling and in which the mounting of the hinged sector gear includes a hinge connection aligned with the transverse axis of the coupling and having a manually retractable pintle to permit ready disengagement of said sector gear from the vehicle on which it is mounted.

CARL E. BISHOP.

REFERENCES CITED

The following references are of record in the file of this patent:

UNITED STATES PATENTS

| Number | Name | Date |
| --- | --- | --- |
| 1,078,801 | Munsing | Nov. 18, 1913 |
| 1,179,793 | Barber | Apr. 18, 1916 |
| 2,201,353 | Soulis | Mar. 21, 1940 |
| 2,259,923 | Byrne et al. | Oct. 21, 1941 |